(12) United States Patent
Werner et al.

(10) Patent No.: US 10,364,686 B2
(45) Date of Patent: Jul. 30, 2019

(54) TIAL BLADE WITH SURFACE MODIFICATION

(71) Applicant: MTU AERO ENGINES AG, Munich (DE)

(72) Inventors: André Werner, Munich (DE); Wilfried Smarsly, Munich (DE)

(73) Assignee: MTU AERO ENGINES AG, Munich (DE)

(*) Notice: Subject to any disclaimer, the term of this patent is extended or adjusted under 35 U.S.C. 154(b) by 1419 days.

(21) Appl. No.: 14/287,392

(22) Filed: May 27, 2014

(65) Prior Publication Data
US 2014/0356644 A1    Dec. 4, 2014

(30) Foreign Application Priority Data
May 29, 2013 (DE) .......... 10 2013 209 994

(51) Int. Cl.
*F01D 5/28* (2006.01)
*F01D 25/00* (2006.01)
(Continued)

(52) U.S. Cl.
CPC ............ *F01D 5/28* (2013.01); *B32B 15/01* (2013.01); *B32B 15/016* (2013.01);
(Continued)

(58) Field of Classification Search
CPC ... C21D 7/04; C21D 7/06; C21D 9/50; C21D 10/00; C21D 10/005; F01D 5/28; F01D 25/005; F01D 5/286; F01D 5/288; C22F 1/10; C22F 1/183; C22F 1/04; C23C 30/00; C23C 30/005; F05D 2300/174; F05D 2300/60; Y10T 29/49229; Y10T 428/12993; Y10T 428/12472;
(Continued)

(56) References Cited

U.S. PATENT DOCUMENTS 5,562,999 A * 10/1996 Grunke .................. C23C 10/02
                                                           148/525
6,670,049 B1 * 12/2003 Schaeffer .................. B22F 7/04
                                                           428/552
(Continued)

FOREIGN PATENT DOCUMENTS

DE        10355756 A1    6/2005
DE    102009023060 A1   12/2010
(Continued)

OTHER PUBLICATIONS

"Plate." Merriam-Webster.com. Merriam-Webster, Nov. 2011. Web. Apr. 18, 2018. See https://web.archive.org/web/20090425054359/ https://www.merriam-webster.com/dictionary/plate. See https://web.archive.org/web/20111108120602/http://www.merriam-webster.com/dictionary/plate%5B2%5D.*

*Primary Examiner* — Michael E. La Villa
(74) *Attorney, Agent, or Firm* — Abel Schillinger, LLP

(57) ABSTRACT

A component for a turbomachine having at least one region made of an intermetallic material which is formed from an intermetallic compound or comprises an intermetallic phase as the largest constituent. The intermetallic material is compacted and/or modified in microstructure by microplasticization at least partially at a surface or interface in a region close to the surface or interface.

20 Claims, 3 Drawing Sheets

(51) Int. Cl.
- *C21D 7/06* (2006.01)
- *C21D 7/04* (2006.01)
- *B32B 15/01* (2006.01)
- *B32B 15/04* (2006.01)
- *C23C 30/00* (2006.01)
- *C22F 1/18* (2006.01)
- *C22F 1/10* (2006.01)
- *C21D 9/50* (2006.01)

(52) U.S. Cl.
CPC .......... *B32B 15/017* (2013.01); *B32B 15/043* (2013.01); *C21D 7/04* (2013.01); *C22F 1/10* (2013.01); *C22F 1/183* (2013.01); *C23C 30/00* (2013.01); *C23C 30/005* (2013.01); *F01D 5/286* (2013.01); *F01D 5/288* (2013.01); *F01D 25/005* (2013.01); *C21D 7/06* (2013.01); *C21D 9/50* (2013.01); *F05D 2300/174* (2013.01); *F05D 2300/60* (2013.01); *Y10T 29/49229* (2015.01); *Y10T 428/12472* (2015.01); *Y10T 428/12736* (2015.01); *Y10T 428/12743* (2015.01); *Y10T 428/12764* (2015.01); *Y10T 428/12806* (2015.01); *Y10T 428/12931* (2015.01); *Y10T 428/12937* (2015.01); *Y10T 428/12993* (2015.01)

(58) Field of Classification Search
CPC ..... Y10T 428/12806; Y10T 428/12931; Y10T 428/12937; Y10T 428/12736; Y10T 428/12743; Y10T 428/12764; B32B 15/01; B32B 15/016; B32B 15/017; B32B 15/043

See application file for complete search history.

(56) References Cited

U.S. PATENT DOCUMENTS

| | | |
|---|---|---|
| 2007/0068605 A1 | 3/2007 | Statnikov |
| 2012/0055222 A1 | 3/2012 | Bamberg et al. |
| 2012/0217226 A1 | 8/2012 | Bayer et al. |

FOREIGN PATENT DOCUMENTS

| | | |
|---|---|---|
| DE | 102009051551 A1 | 5/2011 |
| WO | 2012152259 A1 | 11/2012 |

\* cited by examiner

TIAL BLADE WITH SURFACE MODIFICATION

CROSS-REFERENCE TO RELATED APPLICATIONS

The present application claims priority under 35 U.S.C. § 119 of German Patent Application No. 102013209994.0, filed May 29, 2013, the entire disclosure of which is expressly incorporated by reference herein.

BACKGROUND OF THE INVENTION

1. Field of the Invention

The present invention relates to a component for a turbomachine having at least one region made of an intermetallic material, in particular a TiAl blade for a stationary gas turbine or an aircraft engine, and also to a process for producing such a component.

2. Discussion of Background Information

Intermetallic materials, such as titanium aluminides, which consist to a large extent of intermetallic phases are of interest for specific applications, for example in the construction of aircraft turbines, since, on account of their structure and their chemical bonds, they can have high strengths and at the same time, on account of a low specific weight, can form components having a low weight, as is the case in particular with materials based on titanium aluminides (TiAl materials).

However, for use in stationary gas turbines or aircraft engines, the TiAl materials in certain applications require additional surface modification in order to fulfill all the requirements.

Thus, it is known, for example, to solder on small plates made of a wear-resistant alloy, for example the alloy Tribaloy T800 (trade name of Deloro Stellite Holdings Corporation), in the region of the contact surfaces of shrouds of adjacent blades, what is termed the z notch, in the case of TiAl blades of gas turbines, in order to reduce the wear.

However, intermetallic materials and correspondingly also TiAl blades are difficult to solder, and therefore the soldered joint with the T800 small plates which have been soldered on often does not satisfy the requirements.

Moreover, it may also be necessary to modify the surface in other regions of TiAl blades, in order for example to avoid the formation of cracks, as can form for example in the region of the blade roots at the contact points with the disk groove of a rotor disk or during the impingement of particles on the main blade part.

In view of the foregoing, it would be advantageous to provide surface modification for components based on intermetallic materials, such that firstly the connection to other components, for example wear-resistant plates, is improved and secondly the surface generally becomes less sensitive to the formation of cracks. It would also be advantageous if a a corresponding surface modification could be made easily and reliably.

SUMMARY OF THE INVENTION

The present invention provides a component for a turbomachine. The component comprises at least one region made of an intermetallic material which is formed from an intermetallic compound or comprises an intermetallic phase as the largest constituent, in particular to an extent of more than 50% by volume. The intermetallic material is compacted and/or modified in microstructure, in particular deformed, by microplasticization at least partially at a surface or interface in a region close to the surface or interface.

In one aspect of the component, the interface may be an interface to a coating of the component or the interface of an integral bond.

In another aspect of the component, the intermetallic material may be selected from silicides, nickel aluminides, titanium aluminides.

In yet another aspect of the component of the present invention, the component may be micro-alloyed and/or diffusion welded in the region of the microplasticization.

In a still further aspect, the component may be a blade of a turbomachine that comprises a titanium aluminide material.

In another aspect, the component may be a blade of a turbomachine, which blade comprises a microplasticized region with a plating, in particular a plating comprising a cobalt-base alloy, or a microplasticized, micro-alloyed region in the region of the shroud stop surface and/or of the blade root flank, the micro-alloyed region being alloyed with at least one element selected from niobium, tantalum, molybdenum, tungsten, platinum, rhenium.

The present invention also provides a process for producing a component for a turbomachine, in particular a component as set forth above, including the various aspects thereof. In this process there is provided a component having at least one region made of an intermetallic material which is formed from an intermetallic compound or comprises an intermetallic phase as the largest constituent, in particular to an extent of more than 50% by volume, and microplasticization is carried out in the intermetallic material at least partially at a surface or interface in a region close to the surface or interface.

In one aspect of the process, the microplasticization may be effected thermally and/or mechanically.

In another aspect, the microplasticization may be carried out as high-speed microplasticization.

In yet another aspect, the microplasticization may be effected by micropeening, in particular ultrasonic peening.

In a still further aspect of the process of the present invention, a plate or a coating in the form of a powder, a film, a lacquer or a vapor-deposited layer may be applied to the region subjected to the microplasticization before the microplasticization. For example, the plate may be applied by ultrasonic welding.

The present invention is based on the idea that, in intermetallic materials, it is possible to achieve an improvement in the connection properties to adjacent components or in general terms a resistance of the surface to the formation of cracks by virtue of the fact that microplasticization is carried out in a region close to the surface or interface, since microplasticization of the intermetallic materials can be carried out surprisingly effectively in spite of the high strengths and the partly brittle behavior of the intermetallic phases with respect to macroscopic deformation. The microplasticization leads to compaction in the region close to the surface or interface or in general terms to a modification of the microstructure and in particular to the formation of residual compressive stresses, which lead to an increase in the surface strength and thus to a reduction in the formation of cracks.

The microplasticization can be performed directly in the region of the surface of a corresponding component or else at corresponding interfaces, for example an interface between a coating of the component and the base material of the component or an interface formed at an integral bond between the component and another component.

The intermetallic material can be formed on the basis of titanium aluminides, nickel aluminides or silicides, the material containing one or more different intermetallic phases based on said constituents as the largest constituent.

The microplasticization can be effected thermally and/or mechanically, the microplasticization involving locally narrowly delimited mechanical deformation and/or heating. By way of example, use can be made of high-speed microplasticization, it being possible for this to be carried out by micropeening, in particular ultrasonic peening, as described, for example, in US 2007/0068605 A1, the entire disclosure of which is incorporated by reference herein, for use in metals and in particular in aluminum alloys.

The thermal microplasticization can be generated by local heating, for example by means of inductive heating, or by beam heating, for example laser beams. It goes without saying that a combination of mechanical microplasticization by micropeening and thermal microplasticization by local heating is also possible.

In addition, micro-alloying and/or diffusion welding can be effected in the region of the microplasticization.

The micro-alloying can be effected by mechanical alloying, in which case corresponding alloying constituents can be provided, before the surface is treated, by powder application, lacquering, vapor deposition or the application of a film and can then be incorporated in the surface of the component by micropeening. A thermal treatment can assist the alloying operation.

In particular, TiAl blades for stationary gas turbines or aircraft engines can be modified in various regions with or without a coating or plating in their surface or interface in order to adapt them to the requirement profile for use in corresponding gas turbomachines.

BRIEF DESCRIPTION OF THE DRAWINGS

The accompanying drawings show, purely schematically, in

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show details of the present invention in more detail than is necessary for the fundamental understanding of the present invention, the description in combination with the drawings making apparent to those of skill in the art how the several forms of the present invention may be embodied in practice.

Figure 1:
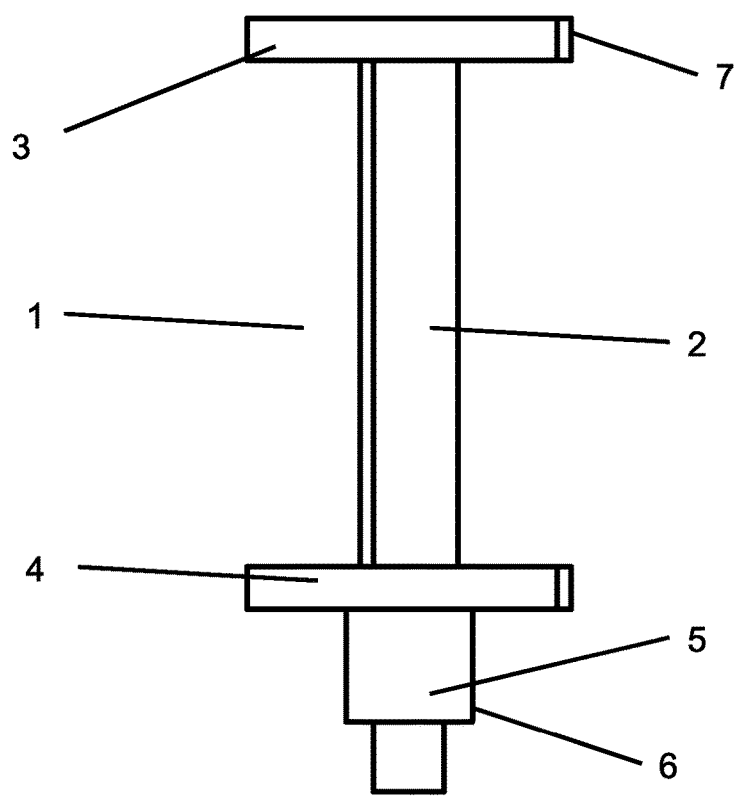
FIG. 1 a side view of a blade for a turbomachine as can be used in the present invention.

FIG. 1 shows a purely schematic side view of a blade of a stationary gas turbine or of an aircraft engine, as can be used for example in the high-pressure compressor or in the low-pressure turbine. The blade 1 has a main blade part 2 having an outer shroud 3 on the radially outer side (radially in relation to the arrangement in the gas turbine) and an inner shroud 4 in the root region. The root 5 of the blade 1 serves for arranging the blade 1 in a rotor disk. Accordingly, the root 5 has a root flank 6, which bears against a wall of the receiving groove of a rotor disk (not shown) when the blade 1 is arranged in a rotor disk. Since a multiplicity of blades 1 are arranged alongside one another in a rotor disk, stop surfaces 7, at which the shrouds 3, 4 of adjacent blades 1 bear against one another, are also present on the shrouds 3, 4.

Figure 2:
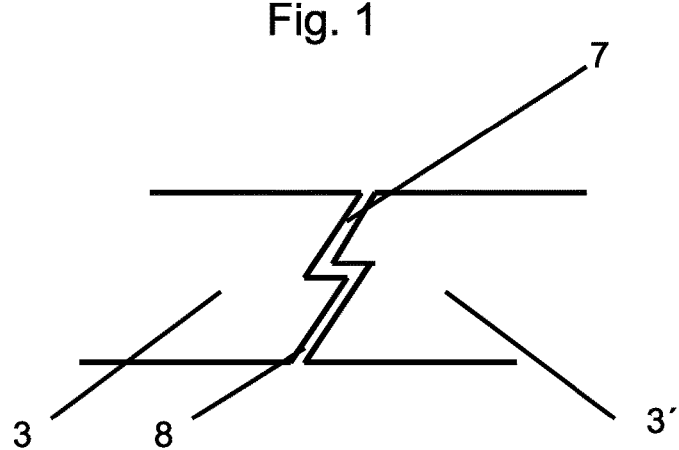
FIG. 2 a plan view of the shrouds of two blades arranged alongside one another.

This is illustrated in a plan view, in FIG. 2, of the outer shrouds 3, 3' of two blades arranged alongside one another, the stop surfaces 7 between them forming a z-shaped groove 8, what is termed a z notch.

Owing to the relative movement of the adjacent shrouds 3, 3' in relation to one another, the stop surfaces 7 are subjected to a particular amount of wear.

Figure 3:
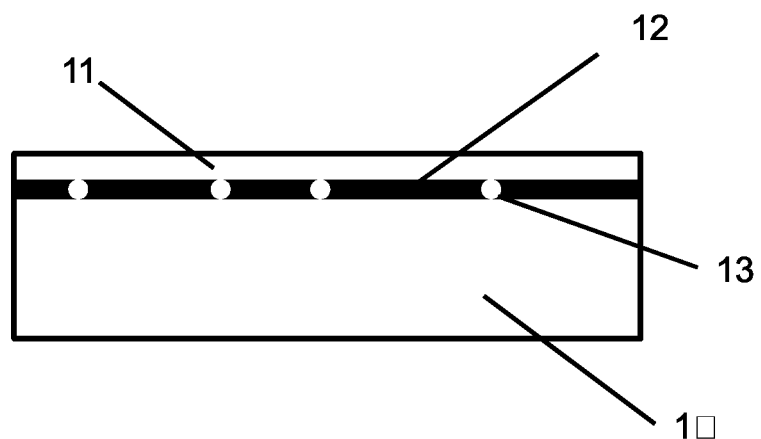
FIG. 3 a lateral cross-sectional view through a component with a plate welded thereon before the microplasticization is carried out.

In order to reduce the wear at the stop surfaces 7 or to keep it as small as possible in the case of blades 1 formed from TiAl materials, i.e. TiAl alloys with a large proportion of intermetallic phases based on TiAl, the stop surfaces 7 are provided with small plates made of a wear-resistant alloy, for example a CoCrMo alloy (e.g. T800 (trade name of Deloro Stellite Holdings Corporation)), as is shown in a schematic illustration in FIG. 3.

FIG. 3 shows a component 10, for example the shroud 3 with the stop surface 7 of the blade 1 shown in FIG. 1, on which a small plate made of the Tribaloy T800 alloy with a composition of 16.5% to 18.5% by weight chromium, 27% to 30% by weight molybdenum, 3% to 3.8% by weight silicon and 0% to 3.0% by weight nickel and iron, remainder cobalt, has been arranged by way of ultrasonic welding. The ultrasonic welding of the small plate 11 to the component 10 has formed a welding zone 11, in which pores 13 can be present, however.

In order to eliminate the pores 13 and to compact the welding zone 12, the corresponding component 10 is subjected, together with the small plate 11 which has been welded on, to high-speed microplasticization by ultrasonic peening, in order to compact the welding zone 12.

Figure 4:
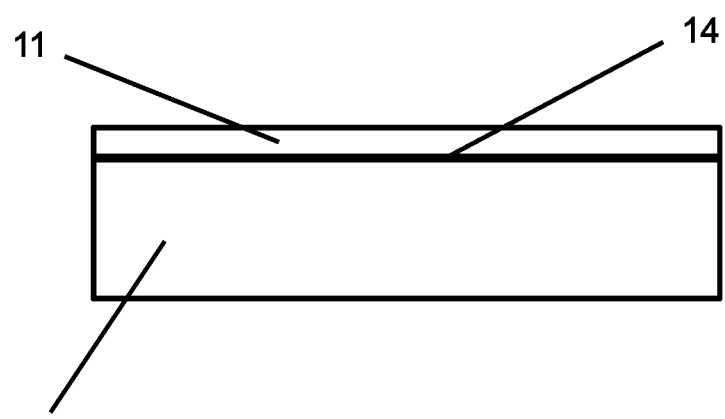
FIG. 4 a lateral cross-sectional view through the component shown in FIG. 3 after microplasticization has been carried out.

FIG. 4 shows the machined component 10 after the ultrasonic peening, the welding zone 14 now having been compacted and not comprising any pores.

As an alternative to welding the Tribaloy T800 small plate 11 to the component 10 by means of ultrasonic welding, a soldered joint between the small plate 11 and the component 10 is also possible, in which case the soldered layer can be compacted in a similar manner by microplasticization, for example in the form of ultrasonic peening. In both cases, the compaction achieves an improvement in the connection between the small plate and the component 10.

Figure 5:
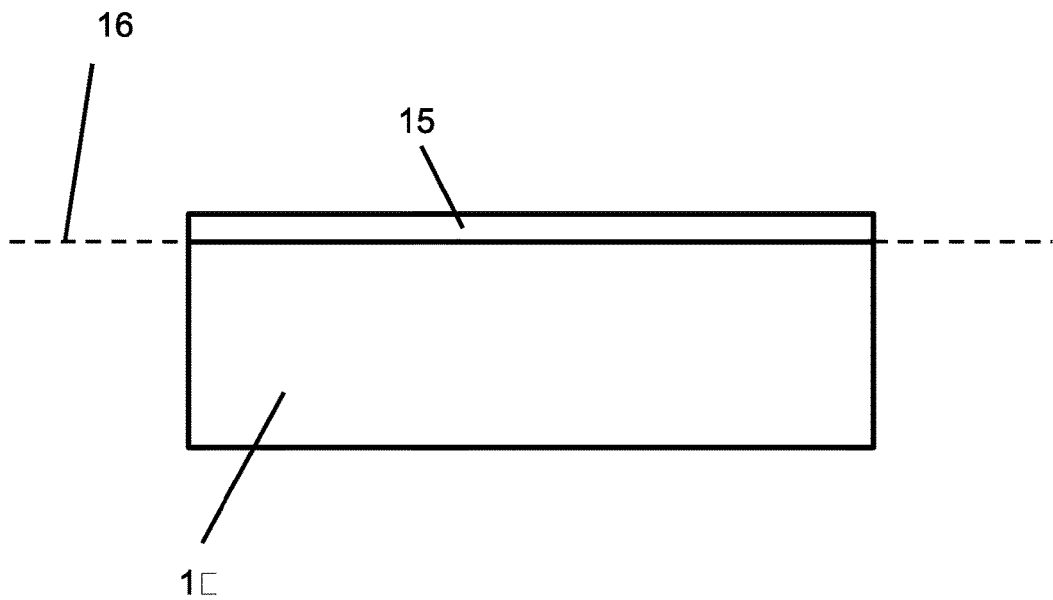
FIG. 5 a lateral cross-sectional view through a component with an applied coating before the microplasticization is carried out; and in FIG. 6 a lateral cross-sectional view through the component shown in FIG. 5 after the microplasticization has been carried out.
Figure 6:
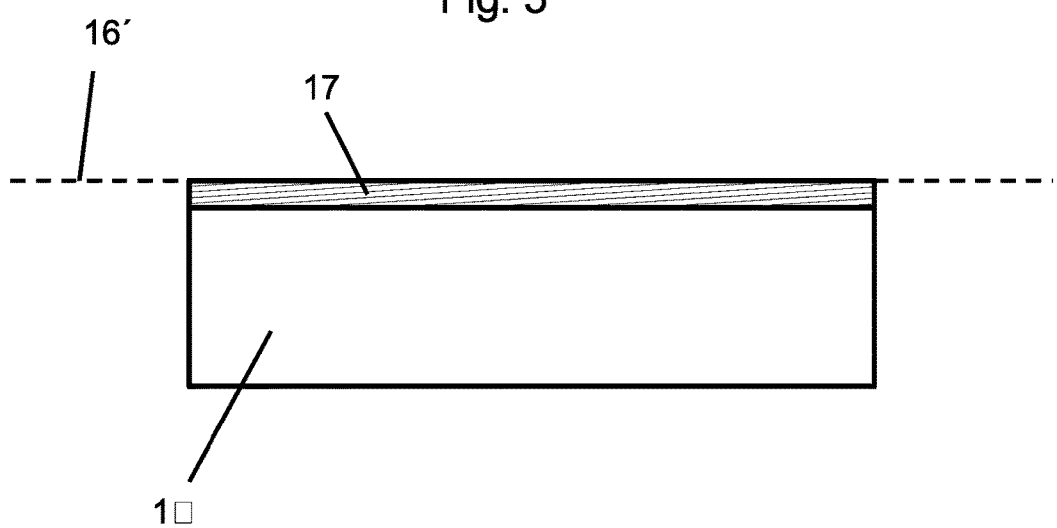

FIGS. 5 and 6 show further examples of the use, according to the invention, of microplasticization in the TiAl blade 1 shown in FIG. 1. FIG. 5 shows a component 10 having a component surface along the dashed line 16, to which a coating 15 has been applied. By way of example, the component can be the blade root flank 6, which is likewise exposed to high levels of loading owing to the contact with the groove walls of the disk groove. The coating 15 can be applied in the form of a powder, a film, a lacquer or in the form of a vapor-deposited coating. The coating can comprise refractory metals as strengthening elements for the TiAl material, for example niobium, tantalum, molybdenum, tungsten, platinum and/or rhenium. The component 10 together with the coating 15 is in turn subjected to high-speed microplasticization, for example in the form of ultrasonic peening, in which case it is additionally possible for a heat treatment to be carried out at the same time as or following the ultrasonic peening, in order to make diffusion possible in the surface region. The heat treatment can in this context likewise be carried out in a locally delimited manner, in a manner similar to the ultrasonic peening, for example by inductive heating or by laser beam heating, such that merely narrowly delimited regions, in particular merely regions close to the surface, are correspondingly heated.

The microplasticization by the ultrasonic peening and the thermally induced diffusion lead to the formation of a mechanically alloyed and microplasticized zone 17 at the surface of the component 10, which is now indicated by the dashed line 16', the zone 17 being compacted and strengthened such that the formation of cracks is avoided when using a corresponding component, for example in the form of a blade root in a disk groove.

Moreover, there are further possible applications for microplasticization in TiAl blades, for example in the region of the main blade part 2. The surface of the main blade part 2 can be compacted and strengthened alone by microplasticization, i.e. for example ultrasonic peening, in order to be stabilized with respect to the formation of cracks by particle impact. In addition, the surface can be further modified and improved by mechanical alloying.

The ultrasonic peening can be carried out with an operating frequency of, for example, 1 to 100 kHz and an operating power of, for example, 10 to 10,000 watts, with an effective power of, for example, 5 Newton to 5000 Newton. The machining can be effected in pulses, in particular in short pulses with a duration of, for example, 0.1 to 5 seconds.

While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A component for a turbomachine, wherein the component comprises at least one region made of an intermetallic material which is formed from an intermetallic compound or comprises an intermetallic phase as largest constituent, on which region a plate is arranged, and wherein the intermetallic material has been compacted and/or modified in microstructure by microplasticization at least partially at a surface or interface in a region close to the surface or interface where the plate is arranged.

2. The component of claim 1, wherein the plate is made of an alloy.

3. The component of claim 1, wherein the plate has been attached to the region by welding.

4. The component of claim 1, wherein the plate has been attached by soldering.

5. The component of claim 1, wherein the intermetallic material is selected from one or more of silicides, nickel aluminides, and titanium aluminides.

6. The component of claim 1, wherein the component is micro-alloyed and/or diffusion welded in a region of the microplasticization.

7. The component of claim 1, wherein the component is a blade of a turbomachine comprising a titanium aluminide material.

8. The component of claim 1, wherein the component is a blade of a turbomachine and the microplasticized region is alloyed with at least one element selected from niobium, tantalum, molybdenum, tungsten, platinum, or rhenium.

9. The component of claim 1, wherein the intermetallic material comprises more than 50% by volume of the intermetallic phase.

10. The component of claim 1, wherein the intermetallic material has been compacted and/or modified in microstructure by microplasticization at least partially following an attachment of the plate to the at least one region.

11. The component of claim 10, wherein the plate has been attached to the region by welding.

12. The component of claim 10, wherein the plate has been attached by soldering.

13. A component for a turbomachine, wherein the component comprises at least one region made of an intermetallic material which is formed from an intermetallic compound or comprises an intermetallic phase as largest constituent, on which region a coating in the form of a powder, a film, a lacquer or a vapor-deposited layer has been applied before the intermetallic material has been compacted and/or modified in microstructure by microplasticization at least partially at a surface or interface in a region close to the surface or interface with the coating.

14. The component of claim 13, wherein the intermetallic material is selected from one or more of silicides, nickel aluminides, and titanium aluminides.

15. The component of claim 13, wherein the region on which a coating is applied is a part of blade of a turbomachine and the coating comprises at least one of niobium, tantalum, molybdenum, tungsten, platinum, or rhenium.

16. The component of claim 13, wherein a coating in the form of a powder, a film, or a lacquer has been applied to the region of the component.

17. The component of claim 13, wherein the region on which the coating is applied is a part of a blade of a turbomachine.

18. The component of claim 17, wherein the blade comprises a titanium aluminide material.

19. The component of claim 17, wherein the part of the blade is a blade root flank.

20. The component of claim 17, wherein the part of the blade is a main blade part.

* * * * *